United States Patent [19]

Jung et al.

[11] Patent Number: 5,763,352
[45] Date of Patent: Jun. 9, 1998

[54] CATALYST COMPOSITION FOR THE PURIFICATION OF THE EXHAUST OF DIESEL VEHICLES, CATALYST USING THE SAME AND PREPARING METHODS THEREOF

[75] Inventors: Hyun-Jong Jung, Seoul; Bon-Chul Ku, Daejeun; Yong-Woo Kim, Daejeun; Yong-Taek Choi, Daejeun; Ki-Ho Lee, Daejeun; Kyeong-Cheol Min, Daejeun; Jae-Woong Um, Daejeun, all of Rep. of Korea

[73] Assignee: Yukong Ltd., Seoul, Rep. of Korea

[21] Appl. No.: 493,501

[22] Filed: Jun. 22, 1995

Related U.S. Application Data

[63] Continuation-in-part of Ser. No. 453,794, May 30, 1995, abandoned.

[30] Foreign Application Priority Data

May 30, 1994 [KR] Rep. of Korea ............ 94-11904

[51] Int. Cl.$^6$ .................... B01J 23/22; B01J 23/26; B01J 23/76
[52] U.S. Cl. ............... 502/315; 502/305; 502/311; 502/312; 502/314
[58] Field of Search ............... 502/305, 311, 502/312, 314, 315

[56] References Cited

U.S. PATENT DOCUMENTS 4,221,768  9/1980  Inoue et al. ............... 423/239

*Primary Examiner*—Glenn Caldarola
*Assistant Examiner*—Alexander G. Ghyka
*Attorney, Agent, or Firm*—Abelman, Frayne & Schwab

[57] ABSTRACT

The composition based on a discharge from an oil refining plant after a desulfurization of heavy oils in the oil refining plant using a catalyst, comprising: 80% or less of vanadium; 80% or less of molybdenum; 20% or less of nickel; 30% or less of cobalt; 99% or less of alumina; and a trace of the impurities, which is catalytically active to purify the exhaust of diesel vehicles. A filter or a washcoat made of the discharged catalyst composition alone or in combination with ordinary filtering materials or ordinary washcoat materials can be very useful for purification of smoke. In addition, a catalyst in which at least one metal of the platinum group is uniformly impregnated on the filter is quite superior to conventional ones employing alumina or titania as a washcoat in stability to both high temperature and sulfur trioxide.

20 Claims, No Drawings

CATALYST COMPOSITION FOR THE PURIFICATION OF THE EXHAUST OF DIESEL VEHICLES, CATALYST USING THE SAME AND PREPARING METHODS THEREOF

This application is a continuation in part of No. 08/653,796, filed May 30, 1995, now abandoned.

BACKGROUND OF THE INVENTION

1. Field of the Invention

The present invention relates, in general, to a catalyst composition and a catalyst useful to purify the exhaust of diesel vehicles and, more particularly, to the use of a catalytically useful composition discharged during or subsequent to desulfurizing oil as a catalyst composition, or a catalyst for removing the particulate materials contained in an exhaust gas of a diesel vehicle, which has great stability both thermally and chemically in addition to being superior in burning. Also, the present invention is concerned with preparing methods thereof.

2. Description of the Prior Art

Particulate materials contained in the exhaust gas from automobiles using diesel fuel have, on average, a diameter of about 0.3 μm and generally comprise incompletely burned carbon particles, soluble organic materials, sulfides and so on. These particulate materials are very harmful to the human body. For example, they give an intensely unpleasant feeling visually and may act also as a carcinogen. For these reasons environmental standards for the exhaust of diesel vehicles have been established (e.g. smoke regulation value for heavy-duty automobiles in Korea, 1993: 40%). They are a main contributor to air pollution in Korea, where the percentage of diesel automobiles is 42%, higher than in any other country. Accordingly, it is required that these particulates be purified and their exhaust be more strictly regulated.

The exhaust standards for the particulate materials shows a yearly strictness, e.g. for heavy-duty automobiles, 0.67 g/HP.Hour in Korea, 1996, 0.1 g/HP.Hour in U.S.A., 1994. In response to these strict regulations, intensive research and development efforts have been directed to eliminating the particulate materials contained in the exhaust of diesel vehicles.

From a large standpoint, techniques for eliminating the particulate materials now proceed into three directions: restraint of generation of unburned materials through improvement of engine performance; improvement in combustion efficiency by use of fuel additives; and after-treatment on the particulate materials. The first two techniques aim at reducing the harmful materials basically from an engine by enhancing the combustion efficiency thereof. However, they require high production cost and further, cannot completely prevent the formation of the harmful materials because of their obvious technological limitations Naturally, after-treatment techniques have become more important.

An after-treatment technique consists virtually of a filtering process for collecting particulate materials of an exhaust gas in a filter and a regeneration process for removing the retained particulate materials from the filter for its reuse. Essential to the former processes is the selection of a filter capable of collection with high efficiency and its proper application to practical vehicles. As particulate materials are retained in the filter, the back pressure of the exhaust system increases, which damages the filter and further lowers engine performance. Combustion of the collected particulate materials at high temperatures gives a thermal stress to the filter, deleteriously affecting its durability. Accordingly, the regeneration processes have been developed in the direction of efficient combustion at lower temperatures. The most extensively used regeneration process comprises an increase of temperature of exhaust gas by providing a secondary energy from an external heat source such as a burner or heater or by throttling, and a reduction in the activation energy of oxidation reaction by using fuel additives or impregnating catalyst on a filter, thereby carrying out the oxidation reaction at lower temperatures.

The present invention utilizes a catalytic action to lower the activation energy in an oxidation reaction of the particulate materials, thereby burning them under the ordinary running of a diesel engine and ordinary exhaust conditions including gas composition and temperature. The catalytic action is generally accomplished by impregnating catalytically active ingredients on a filter containing a refractory three-dimensional structure such as ceramic foam, wire mesh, metal foam, wall flow ceramic honeycomb or open flow ceramic honeycomb.

Followings are the general requirements for a catalyst for purifying the exhaust of diesel vehicles.

First, the catalyst should remove harmful ingredients such as unburned hydrocarbons as well as fine carbon particles among the exhaust at low temperatures with high efficiency.

Second, it should be able to inhibit the oxidation reaction of $SO_2$, generated in the engine from the fuel containing sulfur components, to $SO_3$ so that the $SO_3$ content in the exhaust is minimized.

Third, the catalyst activity should not be affected by poisoning agents such as $SO_2$ and so on.

Fourth, it is durable enough to be active at high temperatures and for long times.

In order to enhance the efficiency of the catalyst to remove the particulate material by combustion, various techniques have been suggested. In these techniques, a wide surface area for catalytic reaction Is obtained by uniformly washcoating a washcoat as a catalyst carrier, such as active alumina or titania, on a filter and impregnating a metal of the platinum Group, known as a combustion catalyst for the particulate material, on a filter by means of a metal salt solution. However, these techniques turned out to be unable to bring about satisfactory effects. Typical alumina is stable at high temperatures, e.g. about 800° C. and has sufficient durability to be continuously used at these temperatures. But, it reacts with sulfur trioxide, resulting from the combustion of sulfur-rich fuel such as diesel in the engine, to produce aluminum sulfate which then causes a deleterious change in the surface area and pore structure of the catalyst, thereby dropping the activity thereof. In contrast with alumina, titania is chemically stable to sulfur trioxide so that its activity is not degraded by it. However, it is vulnerable to high temperatures, e.g. 500° C. and so. In fact, it is thermally degraded by an exhaust gas ranging, in temperature, from 300° to 600° C., which is common in diesel vehicles. Particularly, when the particulate materials are burned for regeneration of the filter, it repeatedly undergoes rapid temperature elevation and thus reduces in surface area with phase transformation from anatase to rutile. As a result, its pore structure is broken, leading to the lowering of activity and durability. As in the above description, the making of a catalyst satisfying the four requirements has not yet been reported.

SUMMARY OF THE INVENTION

It is an object of the present invention to provide a catalyst composition for purifying the exhaust of diesel vehicles, which is superior in combustion of the particulate materials contained in the exhaust.

It is another object of the present invention to provide a catalyst composition for purifying the exhaust of diesel vehicles, which is capable of keeping the catalytic activity high by virtue of its chemical and thermal stability.

It is a further object of the present invention to provide a catalyst composition for purifying the exhaust of diesel vehicles, whose catalytic action is not deactivated by sulfur oxides generated in the diesel engine.

It is still a further object of the present invention to provide a method for preparing the catalyst composition.

It is yet a further object of the present invention to provide a filter employing the catalyst composition, which is superior in removing the particulate materials contained in the exhaust of diesel vehicles.

It is yet another object of the present invention to provide a method for preparing the filter.

It is an additional object of the present invention to provide a washcoated filter employing the catalyst composition, which is superior in removing the particulate materials contained in the exhaust of diesel vehicles.

It is a further object of the present invention to provide a method for preparing the washcoated filter.

It is a further additional object of the present invention to provide a catalyst for purifying the exhaust of diesel vehicles, in which the filter or the washcoated filter is employed.

It is still an additional object of the present invention to provide a method for preparing the catalyst.

Based on the extensive experiments and intensive study by the present inventors, it was found that the composition discharged subsequent to the desulfurizing process of heavy oil cracking unit in an oil-refining plant contains plenty of catalytically active ingredients which are superior in removing the particulate materials contained in the exhaust of diesel vehicles. Also, the present inventors found that a filter or a washcoated filter made of the discharged composition alone can be quite useful for purification of the smoke. In addition, the experiments revealed that a catalyst in which at least one metal of the platinum group is uniformly impregnated on the filter or washcoated filter is quite superior to conventional ones employing alumina or titania as a washcoat in stability to both high temperature and $SO_x$.

DETAILED DESCRIPTION OF THE INVENTION

Catalysts which are useful for the desulfurizing process of heavy oil cracking unit in an oil-refining plant generally comprise 30 to 50 weight percent aluminum, 0 to 10 weight percent molybdenum, 0 to 3 weight percent nickel and 0 to 3 weight percent phosphorus. They are discharged with quite different compositions from the original ones, as they, during the desulfurizing process, are added with vanadium, cobalt and other catalytically active ingredients that are superior in combustion of the particulate materials contained in an exhaust gas of a diesel vehicle.

Although depending on the operating conditions of the desulfurizing process, the operating time and the compositions of crude oil and the initially charged catalyst, the catalyst composition discharged from the desulfurizing process (hereinafter referred to as "the discharged catalyst") generally comprises 80 weight percent or less of vanadium, 80 weight percent or less of molybdenum, 20 weight percent or less of nickel, 30 weight percent or less of cobalt, 99 weight percent or less of alumina and a trace of the impurities left after rectification of ordinary crude oil.

Since the discharged catalyst contains impurities such as moisture and/or oil, it is heated to remove them therefrom so that it turns into a useful material for the present invention. It is preferred that the heating is carried out at a temperature of about 400° to about 1,000° C. for about 0.5 to about 5 hours. For example, insufficient heating at lower than 400° C. results in insufficient removal of the impurities. On the other hand, heating of greater than 1,000° C. causes a thermal degradation of the catalytically active ingredients contained in the discharged catalyst along with waste of energy. Thereafter, the heated catalyst is pulverized into powders by a grinder. The particle size of powder preferably ranges, in diameter, from about 100 to about 800 mesh. For example, overly large particles at larger than 100 mesh have difficulty in producing a homogeneously mixed slurry which is necessary for a filter of the present invention, as will be described later. On the other hand, if the particle size of powder is smaller than 800 mesh, durability at high temperatures decreases and production cost increases. Accordingly, In one aspect of the present invention, a catalyst composition is prepared by a characteristic method comprising pre-treatment for heating the discharged catalyst and pulverization of the heated catalyst into powder.

The powders of the discharged catalyst are very useful stuff (hereinafter referred to as "YK-R") for a filter, a washcoat and a catalyst, according to the present invention.

In accordance with another aspect of the present invention, a filter for purifying the exhaust of diesel vehicles is prepared by a distinctive method comprising the steps of: mixing YK-R powder alone or in combination with ordinary filtering material powders to give a homogeneous slurry; molding the slurry into a filter structure; and sintering the filter structure to give a filter. For the filtering material slurry, YK-R powder alone or in combination with ordinary filtering material powders is well mixed with a binder, an attacking agent, active materials and water.

The ordinary filtering materials used in the present invention involve ceramic materials such as cordierite, mulite, zirconia, silica and the like. However, all ceramic materials known to the art as the filtering material are available and there is no special limit to them. It is preferred that the ordinary filtering materials are combined with YK-R in an amount of up to 90%. For example, if the content of YK-R powder is below 10%, the resulting filtering material is of insignificant activity which results directly from low concentrations of the above-mentioned catalytically active ingredients.

In the slurry, the binder serves to bind the ceramic filtering materials, and any binder known to the art can be used and there is no special limit to this.

As for the attacking agent, it prevents the ceramic materials from forming into tubular foam, and all known agents are available and there is no special limit.

The active materials are useful to control porosity of the ceramic filter body. Any materials known to the art can be used and there is no special limit to them.

Using a process known as to be useful for molding of ceramic material, such as injection or extrusion, the filtering material slurry obtained is formed into a filter structure which is then dried at a temperature of about 25° to about 150° C., followed by sintering at a temperature of about 200° to about 1,000° C. This filter structure can adopt any three-dimensional known as to be useful to purify the particulate materials contained in the exhaust of diesel vehicles, such as ceramic foam, open-flow honeycomb, ceramic fiber filter, ceramic honeycomb and wall-flow honeycomb monolith, and there is no special limit to this.

YK-R powders can be applied for a washcoat which is useful to prepare a washcoated filter for burning the particulate materials of exhaust gas of diesel vesicle. Accordingly, in a further aspect of the present invention, a washcoated filter for purifying the exhaust of diesel vehicles is prepared by a characteristic method comprising the steps of: mixing YK-R powder alone or in combination with ordinary washcoat powders to give a washcoat slurry; washcoating the washcoat slurry on the surface of a filter structure; and sintering the washcoated filter structure. As an ordinary washcoat used in the present invention, any zeolite known to the art as to be useful are available and there is no special limit to this. Illustrative are of alumina, titania and silica. It is preferred that the washcoat powder is combined with YK-R powder in an amount of up to 90%. For example, if the content of YK-R powder is below 10%, the resulting deposit material is of insignificant activity which results directly from low concentrations of the above-mentioned catalytically active ingredients.

For the washcoat slurry, YK-R powder alone or in combination with ordinary washcoat powders is homogeneously mixed in water, and added with such an amount of acid or base as to give a viscosity of 400 cps or less. The washcoat powder including YK-R powder preferably amounts to about 3 to about 50 weight percent of the slurry. For example, if the total quantity of the washcoat powder is below 3 weight percent, the above-mentioned catalytically active ingredients are too little to effect catalysis. On the other hand, if the total quantity of the washcoat powder is above 50 weight percent, it is too much to prepare the washcoat slurry having low viscosity. The viscosity of 400 cps or less is necessary for a uniform coating of the washcoat slurry on an ordinary filter structure.

This filter structure can adopt any three-dimensional structure known as to be useful to purify the particulate materials contained in the exhaust of diesel vehicles, such as ceramic foam, open-flow honeycomb, ceramic fiber filter, ceramic honeycomb, metal foam, wall-flow honeycomb monolith and metal mesh, and there Is no special limit to this.

5 to 200 g of the washcoat is deposited into the 1 liter of the filter structure which is then dried and heated into about 400° to about 1,000° C. If the washcoat is used in an amount of less than 5 g per liter of the filter structure, there is not secured sufficient surface area to allow the catalytically active ingredients to purify the exhaust of diesel vehicles. On the other hand, if the washcoat is used in an amount of more than 200 g per liter of the filter structure, the back pressure of the exhaust system increases overly, leading to a decrease of operating efficiency of the engine. In order to provide enough surface area, this washcoat slurry is preferably deposited on the surface of the filter made of YK-R according to the present invention.

The washcoated filter or the filter prepared from YK-R according to the present invention is used to produce a catalyst. The washcoated filter or the filter is immersed in a catalytic metal solution and then subjected to calcining at a temperature of 400° to 800° C. Accordingly, in still another aspect of the present invention, a catalyst for purifying an exhaust of diesel vehicle is prepared by a characteristic method comprising the steps of: impregnating catalytic metal on the washcoated filter or the filter of the invention; and calcining the resulting impregnated filter at a temperature of about 400° to about 800° C.

Useful catalytic metal is at least one selected from platinum Group. Concrete examples of the catalytically active metal include platinum, rhodium and palladium. It preferably comprises 0 to 7.07 g for platinum, 0 to 2 g for rhodium and 0 to 7.07 g for palladium per liter of the filter in which at least one of said metals is present in an amount sufficient to effect the catalytic action.

At least one precious metal selected from a group consisting of platinum, rhodium and palladium is deposited on the washcoat preferably in an amount of 0.001 to 0.1 mass per mass of washcoat. For example, if the ratio of the precious metal to the washcoat is lower than 0.001/1, the impregnated precious metal is too little to effect the catalytic action. On the other hand, if the ratio is over 0.1/1, there is little increase of the catalytic effect of the precious metal according to its increased content but there is a significant increase of cost.

After the catalyst comprising the washcoat or the filter prepared from YK-R was applied to a filtering equipment for diesel vehicle, the engine was run. The exhaust was assayed, revealing that the catalyst or the filter is superior in combustion performance of the particulate materials. In addition, it was exceptionally stable not only at high temperatures, but also to sulfur oxides produced by the diesel engine. This chemical and thermal stability enables it to endure the conditions of diesel vehicles for a long time and thus is suitable for removing the particulate materials of diesel vehicles.

A better understanding of the present invention may be obtained in light of following examples which are set forth to illustrate, and are not to be construed to limit, the present invention.

EXAMPLE 1

Preparing Method of Catalytic Ingredient YK-R 1-1. Composition analysis of initially charged original catalyst and discharged catalyst (YK-R)

After a catalyst for the dehydrosulfurization of heavy oil was charged, as indicated in Table 1 below, in a cracking plant of YuKong, Ltd., Korea, dehydrosulfurization process was carried out for 250 days. 2 g of discharged catalyst was taken, and quantitatively analyzed by ICP (induction coupled plasma). The analytical results are given as shown in Table 2 below, along with the composition of the original catalyst.

TABLE 1

| Compositions of Initially charged original Catalysts for the Desulfurizing Process | | | | | | | |
|---|---|---|---|---|---|---|---|
| | Charged Amount | Composition (wt %) | | | | | |
| Catalyst | kg | Al | V | Mo | Ni | Co | Fe | Others |
| ICR – 132KAQ | 60,134 | 40.8 | — | 6.3 | 2.0 | — | — | 50.9 |
| ICR – 122ZSA | 3,645 | 50.7 | — | — | — | — | — | 49.7 |

TABLE 2

| Compositions of Initially charged and discharged Catalysts | | | | | | | |
|---|---|---|---|---|---|---|---|
| | Composition (wt %) | | | | | | |
| Catalyst | Al | V | Mo | Ni | Co | Fe | Others |
| Initially charged (ICR – 132KAQ + ICR – 122ZSA) | 41.4 | — | 5.9 | 1.9 | — | — | 50.8 |
| Discharged (used for 250 days) | 26.1 | 18.5 | 6.3 | 2.1 | 0.7 | 0.5 | 45.8 |

As apparent from Table 2, the discharged catalyst is quite different from the initially charged catalyst in composition.

1-2. Change of specific surface area according to heating temperature 10 g of the discharged catalyst was heated as indicated in Table 3 below and its specific surface area was measured.

The results are given as shown in Table 3.

TABLE 3

Specific Surface Areas according to Heating Temp. of the Discharged Catalyst

| Heating Temp. °C. | BET Area m²/g | Pore Radius $10^{-10}$ m | Pore Volume cc/g |
|---|---|---|---|
| — | 20.2 | 66 | 0.067 |
| 300 | 9.50 | 127 | 0.060 |
| 500 | 13.3 | 114 | 0.076 |
| 800 | 18.7 | 116 | 0.108 |
| 1000 | 0.81 | — | — |
| 1100 | 0.82 | — | — |

This table shows that insufficient heating of less than 400° C. results in incomplete removal of impurities and that heating of 1,000° C. or more causes a degradation of the catalytically active ingredients, breaking the pore structure thereof.

1-3. Preparation of Catalyst Composition (YK-R) Powder 100 kg of the discharged catalyst was heated to 800° C. at a heating rate of 20° C./min. and maintained at this temperature for 2 hrs. After cooling, it was pulverized into powders with a size of 200 mesh.

EXAMPLE 2

Reaction Tests of YK-R Compositions 2-1. Sample preparation 15 g of each of the YK-R powder prepared in Example 1-3, alumina and titania was taken as composition sample 1 (for example), composition sample 2 and composition sample 3 (both for comparative examples), respectively.

2-2. CO oxidation reaction 1 g of each of the composition samples of Example 2-1 was charged into its reactor and the reaction temperature was controlled. While air containing 200 ppm of CO flowed into the reactor at a space velocity of 50,000/h, the content of CO at the outlet was analyzed by measuring the CO-content and calculating the CO-content. The temperatures at which the conversion rate of CO reached to 50% were measured.

2-3. $C_3H_8$ oxidation reaction

The temperatures at which the conversion rate of $C_3H_8$ reached to 50% were measured in the same manner as in Example 2-2, except that air containing 1,000 ppm of $C_3H_8$ flowed into the reactor.

2-4. $SO_2$ oxidation reaction 1 g of each of the composition samples of Example 2-1 was charged into its reactor and the reaction temperature was controlled. While air containing 50 ppm of $SO_2$ flowed into the reactor at a space speed of 50,000/h, the content of $SO_2$ at the outlet was analyzed by measuring the $SO_2$-content and calculating the $SO_2$-content. The conversion rates of $SO_2$ were measured at 450° C.

2-5. Smoke combustion test

Each of the three composition samples obtained in Example 2-1 was homogeneously mixed with 1 g of the particulate materials taken from the exhaust of a diesel vehicle and then charged in a reactor. The temperature of the reactor was raised at a rate of 10° C./min to 200° C. Since then, the temperature of the reactor was raised at a rate of 1° C./min and the temperatures at which the particulate materials were ignited (smoke combustion temperatures) were measured.

The measurements in Example 2, the temperatures at 50% conversion rates of CO and $C_3H_8$, the conversion rates of $SO_2$ at 450° C. and the smoke combustion temperatures, are given as shown in Table 4 below.

EXAMPLE 3

Durability Assay at High Temperatures

In a furnace 5 g of each of the catalyst composition samples 1, 2 and 3 obtained in Example 2-1 was heated into 800° C. in a heating rate of 20° C./min. and maintained at this temperature for 5 hours. Thereafter, the three catalyst composition samples were subjected to the same oxidation reaction tests for CO, $C_3H_8$ and $SO_2$ and smoke combustion test as those of Example 2. The results are given as shown in Table 4 below.

EXAMPLE 4

Chemical Stability Assay to Sulfur oxides

In a furnace 5 g of each of the catalyst composition samples 1, 2 and 3 obtained in Example 2-1 was heated into 500° C. at a heating rate of 20° C./min., and nitrogen gas containing 100 ppm of $SO_3$ flowed into the furnace in a rate of 2 l/min. for 50 hours. Thereafter, the three catalyst composition samples were subjected to the same oxidation reaction tests for CO, $C_3H_8$ and $SO_2$ and smoke combustion test as those of Example 2. The results are given as shown in Table 4 below.

TABLE 4

| Sample No. | Example 2 | | | | Example 3 | | | | Example 4 | | | |
|---|---|---|---|---|---|---|---|---|---|---|---|---|
| | CO | HC | $SO_2$ | T | CO | HC | $SO_2$ | T | CO | HC | $SO_2$ | T |
| 1 | 159 | 210 | 3.1 | 476 | 163 | 213 | 2.8 | 470 | 165 | 220 | 2.4 | 482 |
| 2* | 261 | 288 | 4.7 | 553 | 262 | 301 | 4.5 | 556 | 277 | 311 | 3.9 | 596 |
| 3* | 183 | 204 | 16.6 | 546 | 247 | 268 | 8.2 | 580 | 185 | 207 | 16.1 | 551 | note:
*:reference
CO: temperature (°C.) at 50% CO conversion rate
HC: temperature (°C.) at 50% $C_3H_8$ conversion rate
$SO_2$: conversion rate (%) of $SO_2$ at 450° C.
T: smoke combustion temperature (°C.)

Table 4 reveals that the discharged catalyst composition (YK-R) alone is superior in the smoke combustion temperature in addition to being very stable thermally to high temperatures and chemically to $SO_x$ and thus, can be used for a long time in purifying the exhaust of diesel vehicles.

EXAMPLE 5

Preparation of Filter 5-1. Preparation of a foam filter 10 ppi polyurethane foam was cut into a dimension of 2 cm×2 cm×2 cm which was then immersed in a solution of water and methyl alcohol (1:1 weight ratio) and dried.

100 g of YK-R obtained in Example 1-3 was added with 15 g of dextrin as a binder and then with 7 g of monoethanol amine as an attacking agent. Following further addition of 60 g of water and 6 ml of ethylene glycol serving as an active material, stirring gave a slurry. This slurry was sufficiently impregnated into the polyurethane foam. As much as 80% of the impregnated slurry was taken off from the polyurethane foam which was then dried. This impregnating procedure was repeated three times, to obtain an impregnated filter with a total weight of 6 g.

After drying at 50° C. for 24 hours, the impregnated filter was sintered at 300° C. for 3 hours at a heating rate of 0.5° C./min and then, at 900° C. for 1 hour at a heating rate of 1° C./min. As result, foam 1 (filter 1) was produced.

Separately, foam 2 (filter 2) was produced as a reference, using cordierite powder instead of YK-R powder.

5-2. Preparation of flow-through honeycomb

A flow-through honeycomb was prepared by an extruding process as follows.

100 g of YK-R powder obtained in Example 1-3 was added with 4 g of methyl cellulose as a binder and 15 g of a pore-forming agent and then subjected to ball-milling in dry and mixed. The mixture thus obtained was added with a suitable amount of water, to give a slurry ranging in strength from 0.8 to 1 mg/mm². It was charged in a screw extruding machine, to form a honeycomb with a diameter of 5 mm. This honeycomb was dried in a furnace at 70° C. for 36 hours. Thereafter, for completion, it was subjected to sintering processes in which the temperature was elevated at several stages (filter 3).

Separately, filter 4 was produced as a reference, using cordierite powder instead of YK-R powder.

5-3. Preparation of wall-flow honeycomb filter

Into a flow-through honeycomb prepared in Example 5-2, a slurry made of the same substance as the flow-through honeycomb was inserted, using a mask made of an easy castable polymer as in U.S. Pat. No. 4,411,856 so as to fill the pores thereof selectively.

As a result, wall-flow honeycomb filter 5 was obtained.

Likewise, a slurry made of YK-R and cordierite (1:1 weight ratio) was used to prepare wall-flow honeycomb filter 6. Separately, wall-flow honeycomb filter 7 was prepared as a reference, using cordierite powder instead of YK-R powder.

EXAMPLE 6

Preparation of Washcoated Filters 400 cpi ceramic honeycomb monolith was cut into a dimension of 2 cm×2 cm×2 cm. 1,000 g of YK-R powder was mixed with 900 g of water and then, milled for 24 hours. Following stirring, the resulting slurry was added with conc. acetic acid and ammonia water, to give pH 4.5 and viscosity 95 cps. The prepared ceramic honeycomb monolith was washcoated with the slurry and a compressed air with 40 psi blew it. Drying it at 120° C. for 10 hours with an elevation rate of 20° C./min. and further heating at 500° C. for 2 hours with the same elevation rate produced washcoated filter 8 in which 1.3 g of YK-R washcoat was impregnated.

Likewise, a slurry made of YK-R and alumina powder (1:1 weight ratio) was used to prepare washcoated filter 9. Separately, washcoated filters 10 and 11 were prepared as references, using alumina and titania powders instead of YK-R powder, respectively.

EXAMPLE 7

Reaction Tests for Filters 7-1. CO oxidation reaction

Each of the filters 1 to 11 prepared in Examples 5 and 6 was set in a reactor and the reaction temperature was controlled. While air containing 200 ppm of CO flowed into the reactor at a space velocity of 50,000/h, the content of CO at the outlet was analyzed by measuring the CO-content and calculating the CO-content. The temperatures at which the conversion rate of CO reached to 50% were measured.

7-2. $C_3H_8$ oxidation reaction

The temperatures at which the conversion rate of $C_3H_8$ reached to 50% were measured in the same manner as in Example 7-1, except that air containing 100 ppm of $C_3H_8$ flowed into the reactor.

7-3. $SO_2$ oxidation reaction

Each of the filters 1 to 11 prepared in Examples 5 and 6 was set in a reactor and the reaction temperature was controlled. While air containing 50 ppm of $SO_2$ flowed into the reactor at a space velocity of 50,000/h, the content of $SO_2$ at the outlet was analyzed by measuring the $SO_2$-content and measuring the $SO_2$-content. The conversion rates of $SO_2$ were measured at 450° C.

7-4. Smoke combustion test 1 g of the particulate materials taken from the exhaust of a diesel vehicles was uniformly charged in each of the filters 1 to 11 prepared in Examples 5 and 6 which was then set in a reactor. The temperature of the reactor was elevated at a rate of 10° C./min to 200° C. Since then, the temperature was elevated at a rate of 1° C./min and the temperatures at which the particulate materials were ignited (smoke combustion temperatures) were measured.

The measurements in Example 7, the temperatures at 50% conversion rates of CO and $C_3H_8$, the conversion rates of $SO_2$ at 450° C. and the smoke combustion temperatures, are given as shown in Table 5 below.

EXAMPLE 8

Durability Assay at High Temperatures

In a furnace each of the filters 1 to 11 obtained in Examples 5 and 6 was heated into 800° C. at a heating rate of 20° C./min. and maintained at this temperature for 5 hours. Thereafter, these filters were subjected to the same oxidation reaction tests for CO, $C_3H_8$ and $SO_2$ and smoke combustion test as those of Example 7. The results are given as shown in Table 5 below.

EXAMPLE 9

Chemical Stability Assay to Sulfur Oxide

In a furnace each of the filters 1 to 11 obtained in Examples 5 and 6 was heated into 500° C. at a heating rate of 20° C./min. Thereafter, a nitrogen gas containing 100 ppm of $SO_3$ was flowed at a rate of 2 l/min for 50 hours into the furnace. These filters were subjected to the same oxidation reaction tests for CO, $C_3H_8$ and $SO_2$ and smoke combustion test as those of Example 7. The results are given as shown in Table 5 below.

EXAMPLE 11

Reaction Tests of Catalysts

Catalysts 12 to 22 prepared in Example 10 were subjected to the same oxidation reaction tests for CO, $C_3H_8$ and $SO_2$ and smoke combustion test as those of Example 7. The results are given as shown in Table 6 below.

EXAMPLE 12

Durability Assay for Catalysts at High Temperatures

In the atmosphere each of the catalysts 12 to 22 obtained in Example 10 was sintered at 600° C. for 7 days. Thereafter,

TABLE 5

| Sample No. | Example 7 | | | | Example 8 | | | | Example 9 | | | |
| --- | --- | --- | --- | --- | --- | --- | --- | --- | --- | --- | --- | --- |
| | CO | HC | $SO_2$ | T | CO | HC | $SO_2$ | T | CO | HC | $SO_2$ | T |
| 1 | 171 | 223 | 2.8 | 481 | 176 | 228 | 2.2 | 482 | 178 | 231 | 2.1 | 485 |
| 2* | 287 | 305 | 7.5 | 560 | 281 | 310 | 7.1 | 562 | 301 | 312 | 4.1 | 579 |
| 3 | 176 | 233 | 2.1 | 491 | 181 | 235 | 2.2 | 493 | 179 | 236 | 2.0 | 491 |
| 4* | 288 | 311 | 6.8 | 567 | 287 | 319 | 6.5 | 568 | 322 | 331 | 5.1 | 570 |
| 5 | 175 | 230 | 2.5 | 486 | 177 | 230 | 2.4 | 486 | 176 | 231 | 2.1 | 487 |
| 6 | 277 | 295 | 3.1 | 497 | 276 | 290 | 3.0 | 499 | 289 | 305 | 2.4 | 503 |
| 7* | 289 | 311 | 6.7 | 563 | 287 | 318 | 6.2 | 565 | 323 | 335 | 4.9 | 569 |
| 8 | 172 | 232 | 1.4 | 482 | 181 | 238 | 1.4 | 484 | 178 | 238 | 1.4 | 483 |
| 9 | 271 | 292 | 3.7 | 494 | 271 | 290 | 3.7 | 499 | 283 | 299 | 3.1 | 496 |
| 10* | 282 | 303 | 5.8 | 561 | 282 | 310 | 5.1 | 565 | 301 | 315 | 4.1 | 596 |
| 11* | 192 | 213 | 18.4 | 549 | 261 | 298 | 9.4 | 580 | 1.92 | 215 | 18.1 | 556 | note:
*:reference
CO: temperature (°C.) at 50% CO conversion rate
HC: temperature (°C.) at 50% C3H8 conversion rate
$SO_2$: conversion rate (%) of $SO_2$ at 450° C.
T: smoke combustion temperature (°C.)

Table 5 reveals that the washcoats or filters made from YK-R powder alone or in combination with conventional filtering materials or washcoats are superior to conventional ones in the smoke combustion temperature in addition to being very stable thermally to high temperatures and chemically to $SO_X$ and thus, can be used for a long time in purifying the exhaust of diesel vehicles.

EXAMPLE 10

Preparation of Catalyst from YK-R

Using an aqueous platinum chloride solution, 1 weight percent catalytic metal was impregnated on each of the filters 1 to 11 obtained in Examples 5 and 6, which was then dried at 120° C. for 12 hours and calcined at 500° C. for 2 hours with a heating rate of 20° C./min. As a result, catalysts 12 through 22 were obtained.

these catalysts were subjected to the same oxidation reaction tests for CO, $C_3H_8$ and $SO_2$ and combustion test as those of Example 7. The results are given as shown in Table 6 below.

EXAMPLE 13

Chemical Stability Assay for Catalysts to Sulfur Oxide

In a dry air containing 200 ppm of $SO_2$ each of the catalysts 12 to 22 obtained in Example 10 was sintered at 600° C. for 7 days. Thereafter, these catalysts were subjected to the same oxidation reaction tests for CO, $C_3H_8$ and $SO_2$ and smoke combustion test as those of Example 7. The results are given as shown in Table 6 below.

TABLE 6

| Sample No. | Example 11 | | | | Example 12 | | | | Example 13 | | | |
| --- | --- | --- | --- | --- | --- | --- | --- | --- | --- | --- | --- | --- |
| | CO | HC | $SO_2$ | T | CO | HC | $SO_2$ | T | CO | HC | $SO_2$ | T |
| 12 | 96 | 158 | 12.5 | 439 | 105 | 168 | 10.4 | 442 | 100 | 158 | 11.5 | 445 |
| 13* | 104 | 162 | 100 | 487 | 105 | 166 | 93.6 | 492 | 110 | 184 | 100 | 498 |
| 14 | 96 | 165 | 12.1 | 442 | 103 | 162 | 12.4 | 443 | 104 | 167 | 11.9 | 447 |
| 15* | 107 | 169 | 100 | 491 | 108 | 173 | 94.1 | 495 | 117 | 190 | 98.2 | 499 |
| 16 | 95 | 162 | 11.1 | 439 | 106 | 167 | 10.9 | 443 | 104 | 168 | 9.1 | 444 |

TABLE 6-continued

Reaction Tests

| Sample No. | Example 11 | | | | Example 12 | | | | Example 13 | | | |
|---|---|---|---|---|---|---|---|---|---|---|---|---|
| | CO | HC | $SO_2$ | T | CO | HC | $SO_2$ | T | CO | HC | $SO_2$ | T |
| 17 | 109 | 171 | 100 | 488 | 110 | 172 | 90.5 | 490 | 121 | 195 | 95.8 | 499 |
| 18* | 101 | 161 | 55.2 | 461 | 105 | 169 | 51.0 | 462 | 110 | 179 | 43.9 | 483 |
| 19 | 96 | 154 | 18.4 | 440 | 101 | 167 | 8.4 | 442 | 105 | 166 | 18.8 | 448 |
| 20 | 93 | 155 | 61.3 | 455 | 106 | 169 | 57.8 | 458 | 108 | 172 | 38.1 | 479 |
| 21* | 93 | 158 | 100 | 485 | 107 | 170 | 98.5 | 489 | 110 | 185 | 93.1 | 494 |
| 22* | 92 | 154 | 100 | 462 | 120 | 189 | 64.0 | 484 | 94 | 168 | 100 | 466 | note:
*:reference
CO: temperature (°C.) at 50% CO conversion rate
HC: temperature (°C.) at 50% $C_3H_8$ conversion rate
$SO_2$: conversion rate (%) of $SO_2$ at 450° C.
T: smoke combustion temperature (°C.)

As apparent from Table 6, it is recognized that the catalysts taking advantage of the washcoats or filters made of the discharged catalyst compositions are certainly stable both thermally to high temperatures and chemically to sulfur oxides in addition to showing an excellent catalysis effect that the particulate materials can be ignited at quite low temperatures.

EXAMPLE 14

Preparation of Catalyst for Engine Test 100 g of each of the washcoats shown in Table 7 below was deposited per liter of a ceramic wall flow filter such as that sold by Corning Incorporated, U.S.A, under trademark designation "EX-54". Thereafter, a catalytic metal was impregnated on the filter in an amount of 1 weight percent based on the weight of the washcoat. Following drying at 120° C. for 12 hours, calcining at 500° C. for two hours in an air produced catalysts 1 to 6.

In order to assay durability, catalysts 2 and 4 were aged at 800° C. for 7 days. For assay of poisoning resistance, catalysts 3, 5 and 6 were exposed to 200 ppm of $SO_2$ at 200° C. for 7 days.

TABLE 7

Catalysts for Engine Test

| Catalyst No. | Deposit Support | Catalytic Metal | Durability Assay Condition |
|---|---|---|---|
| 1 | YK-R-1 | Palladium | Fresh |
| 2 | YK-R-1 | Palladium | 800° C. × 7 days in Air |
| 3 | YK-R-1 | Palladium | 200° C. × 7 days in $SO_2$ 200 ppm |
| 4 | Titania | Palladium | 800° C. × 7 days in Air |
| 5 | Alumina | Platinum | 200° C. × 7 days in $SO_2$ 200 ppm |
| 6 | Alumina | Palladium | 200° C. × 7 days in $SO_2$ 200 ppm |

EXAMPLE 15

Assay for Regeneration Capability of Catalyst

Each of the catalysts obtained in Example 14 was mounted in a supercharged single cylinder diesel engine sold by Petters limited, England, identified as Model "Petter AV-B". Under a computerized condition that 2250 rpm was set for operating speed, 100° C. for coolant temperature, 90° C. for oil temperature, 2.5 bar for oil pressure and 2230 mbar for air-feeding pressure, the engine had the bypass valve close and the filtering trap valve open. The throttle valve was open a little and, if no regeneration, it was opened further to elevate the temperature of the exhaust. When the regeneration took place, the retained particulates were burned owing to catalyst ignition, reducing the back pressure of the exhaust pipe and increasing the temperature of the back end of the filter trap.

For analysis of the content of sulfur trioxide in the exhaust, a predetermined volume of exhaust was collected in a mixture solution of isopropyl alcohol and water (volume ratio 60:40) for two minutes by a vacuum pump and compared with a standard solution by ion liquid chromatography.

The regeneration temperatures and the content of sulfur trioxide with respect to the six catalysts obtained in Example 14 are given as shown in Table 8 below.

TABLE 8

Engine Test

| Property Assay | Catalyst No. | | | | | |
|---|---|---|---|---|---|---|
| | 1 | 2 | 3 | 4 | 5 | 6 |
| Regeneration Temp. °C. | 410 | 415 | 410 | 458 | 485 | 492 |
| Content of $SO_3$ ppm | 14 | 13 | 18 | 38 | 82 | 20 |

As apparent from Table 8, catalysts 1, 2 and 3, all made of YK-R-1, show excellent durability without inactivation even after being exposed to high temperatures and/or sulfur oxides for long times. Table 8 also reveals that, on exposure to high temperatures for a long time, catalyst 2, made of YK-R-1, is quite superior than catalyst 4, made of titania, in the regeneration temperature and the exhaust of sulfur trioxide. For comparison of catalysts 3,5 and 6, catalyst 3, made of YK-R-1, shows lower regeneration temperature and smaller content of sulfur trioxide than the other catalysts, both made of alumina, do.

As described hereinbefore, the catalysts prepared from YK-R-1 can burn the retained particulate materials at quite low temperatures compared with conventional ones, in addition to being very stable thermally at high temperatures and chemically to sulfur oxide and thus, are useful to purify the exhaust of diesel vehicles for long times under the ordinary running of a diesel engine and ordinary exhaust conditions including gas composition and temperature.

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

The expression "the particulate materials" as used herein refers to the particles contained in an exhaust from an automobile engine.

The expression "the discharged catalyst" as used herein refers to a composition which is discharged subsequent to desulfurizing heavy oils in an oil refining plant.

What is claimed is:

1. A method for preparing a filter for purifying the exhaust of diesel vehicles, comprising the steps of:

mixing a catalyst composition alone or in combination with ordinary filtering material powders with a binder, an attacking agent, active materials and water, to give a homogeneous slurry, said catalyst composition being discharged out of an oil refining plant after a desulfurization of heavy oils in the oil refining plant using a conventional catalyst comprising 30 to 50 wt % aluminum, 0 to 10 wt % molybdenum, 0 to 3 wt % nickel and 0 to 3 wt % phosphorus and said catalyst composition comprising 80% or less of vanadium, 80% or less of molybdenum, 20% or less of nickel, 30% or less of cobalt, and 99% or less of alumina, wherein at least vanadium, molybdenum and alumina are present;

molding said slurry into a filter structure; and sintering the filter structure at a temperature of about 200° to about 1,000° C. to give a filter.

2. A method for preparing a washcoated filter for purifying the exhaust of diesel vehicles, comprising the steps of:

mixing a catalyst composition alone or in combination with ordinary washcoat powders with water and such an amount of acid or base as to give a viscosity of 400 cps or less, to give a washcoat slurry, said catalyst composition being discharged out of an oil refining plant after a desulfurization of heavy oils in the oil refining plant using a conventional catalyst comprising 30 to 50 wt % aluminum, 0 to 10 wt % molybdenum, 0 to 3 wt % nickel and 0 to 3 wt % phosphorus and said catalyst composition comprising 80% or less of vanadium, 80% or less of molybdenum, 20% or less of nickel, 30% or less of cobalt, and 99% or less of alumina, wherein at least vanadium, molybdenum and alumina are present;

washcoating said washcoat slurry on the surface of a filter structure; and sintering the washcoated filter structure at a temperature of 400° to about 1,000° C. to give a washcoated filter.

3. A method for preparing a catalyst for purifying the exhaust of diesel vehicles, comprising the steps of:

impregnating at least one catalytically active metal selected from the group consisting of platinum, palladium and rhodium on a filter or washcoated filter made of a catalyst composition, said catalyst composition being discharged out of an oil refining plant after a desulfurization of heavy oils in the oil refining plant using a conventional catalyst comprising 30 to 50 wt % aluminum, 0 to 10 wt % molybdenum, 0 to 3 wt % nickel and 0 to 3 wt % phosphorus and said catalyst composition comprising 80% or less of vanadium, 80% or less of molybdenum, 20% or less of nickel, 30% or less of cobalt, and 99% or less of alumina, wherein at least vanadium, molybdenum and alumina are present; and calcining the impregnated filter at a temperature of about 400° to about 800° C. to give a catalyst.

4. The method in accordance with claim 1, wherein said catalyst composition is powders prepared by heating a catalytically useful composition which is discharged during or subsequent to desulfurizing oils at a temperature of about 400° to about 1,000° C. for about 0.5 to about 5 hours, and pulverizing the heated catalytically useful composition into powders having a size of 100 to 800 mesh in diameter.

5. The method in accordance with claim 1, wherein said ordinary filtering material powders are at least one selected from the group consisting of cordierite, mulite, zirconia and silica.

6. The method in accordance with claim 1, wherein said slurry comprise an amount of 10 to 100 weight percent said catalyst composition and an amount of 0 to 90 weight percent said ordinary filtering material powders.

7. The method in accordance with claim 1, wherein said filter structure is selected from the group consisting of ceramic foam, open-flow honeycomb, ceramic fiber filter, ceramic honeycomb and wall-flow honeycomb monolith.

8. A filter having a high conversion performance for particulate materials, hydrocarbons, and carbon monoxide at low temperature and inhibiting oxidation of $SO_2$ for purifying the exhaust of diesel vehicles, prepared by the method of claim 1.

9. The method in accordance with claim 2, wherein said catalyst composition is powders prepared by heating a catalytically useful composition which is discharged during or subsequent to desulfurizing oils at a temperature of about 400° to about 1,000° C. for about 0.5 to about 5 hours, and pulverizing the heated catalytically useful composition into powders having a size of 100 to 800 mesh in diameter.

10. The method in accordance with claim 2, wherein said ordinary washcoat powders are at least one selected from the group consisting of alumina, titania and silica.

11. A method in accordance with claim 2, wherein said washcoat slurry comprise an amount of 10 to 100 weight percent said catalyst composition and an amount of 0 to 90 weight percent said ordinary washcoat.

12. The method in accordance with claim 2, wherein said filter structure is selected from a group consisting of ceramic foam, open-flow honeycomb, ceramic fiber filter, ceramic honeycomb, metal foam, metal -mesh and wall-flow honeycomb monolith.

13. The method in accordance with claim 2, wherein said washcoat is deposited in an amount of 5 to 200 g based on 1 liter of said filter structure.

14. A washcoated filter having a high conversion performance for particulate materials, hydrocarbons and carbon monoxide at low temperature and inhibiting oxidation of $SO_2$, for purifying the exhaust gas of a diesel vehicle, prepared by the method of claim 2.

15. The method in accordance with claim 3, wherein said catalyst composition is powders prepared by heating a catalytically useful composition which is discharged during or subsequent to desulfurizing oils at a temperature of about 400° to about 1,000° C. for about 0.5 to about 5 hours, and pulverizing the heated catalytically useful composition into powders having a size of 100 to 800 mesh in diameter.

16. The method in accordance with claim 3, wherein said catalytically active metal comprises 0 to 7.07 g of platinum, 0 to 7.07 g of palladium and 0 to 2 g of rhodium per liter of the filter in which at least one of said metals is present in an amount sufficient to effect the catalytic action.

17. The method in accordance with claim 3, wherein the weight ratio of said metal to washcoat is on the order of 0.001 to 0.1.

18. A catalyst having a high conversion performance for particulate materials, hydrocarbons and carbon monoxide at low temperature and inhibiting oxidation of $SO_2$ for purifying the exhaust gas of a diesel vehicle, prepared by the method of claim 3.

19. A catalyst composition having a high conversion performance for particulate materials, hydrocarbons, and carbon monoxide at low temperature and inhibiting oxidation of $SO_2$ for purifying the exhaust of diesel vehicles, which comprises 80% or less of vanadium, 80% or less of molybdenum, 20% or less of nickel, 30% or less of cobalt, and 99% or less of alumina, wherein at least vanadium, molybdenum and alumina are present, wherein said catalyst composition is discharged out of an oil refining plant after a desulfurization of heavy oils in the oil refining plant using a conventional catalyst comprising 30 to 50 wt % aluminum, 0 to 10 wt % molybdenum, 0 to 3 wt % nickel and 0 to 3 wt % phosphorus.

20. A method for preparing a catalyst composition for purifying the exhaust of diesel vehicles, comprising the steps of:

heating a catalytically useful composition being discharged out of an oil refining plant after a desulfurization of heavy oils in the oil refining plant using a conventional catalyst comprising 30 to 50 wt % aluminum, 0 to 10 wt % molybdenum, 0 to 3 wt % nickel and 0 to 3 wt % phosphorus, at a temperature of about 400° to about 1,000° C. for about 0.5 to about 5 hours; and pulverizing the heated composition into powders having a size of 100 to 800 mesh in diameter to give the catalyst composition comprising 80% or less of vanadium, 80% or less of molybdenum, 20% or less of nickel, 30% or less of cobalt, and 99% or less of alumina, wherein at least vanadium, molybdenum and alumina are present.

* * * * *